(No Model.) 4 Sheets—Sheet 1.
O. SPECKENBACH.
FENDER FOR TROLLEY CARS.
No. 599,920. Patented Mar. 1, 1898.
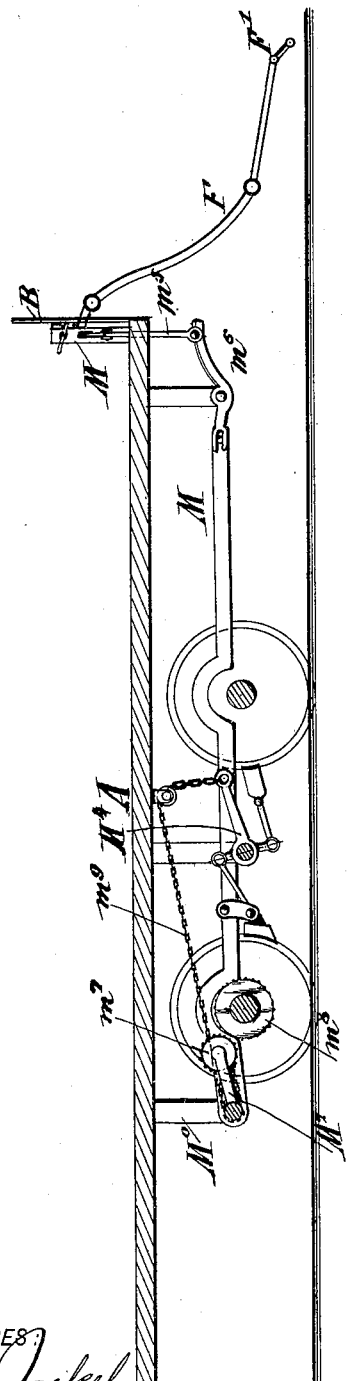
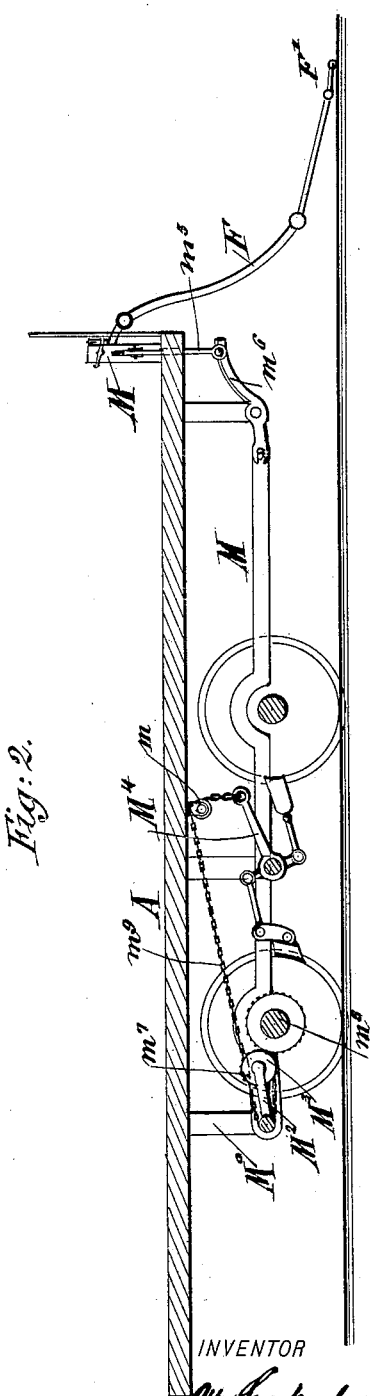
WITNESSES:
INVENTOR
Otto Speckenbach
BY
ATTORNEYS.

(No Model.) 4 Sheets—Sheet 2.
O. SPECKENBACH.
FENDER FOR TROLLEY CARS.
No. 599,920. Patented Mar. 1, 1898.
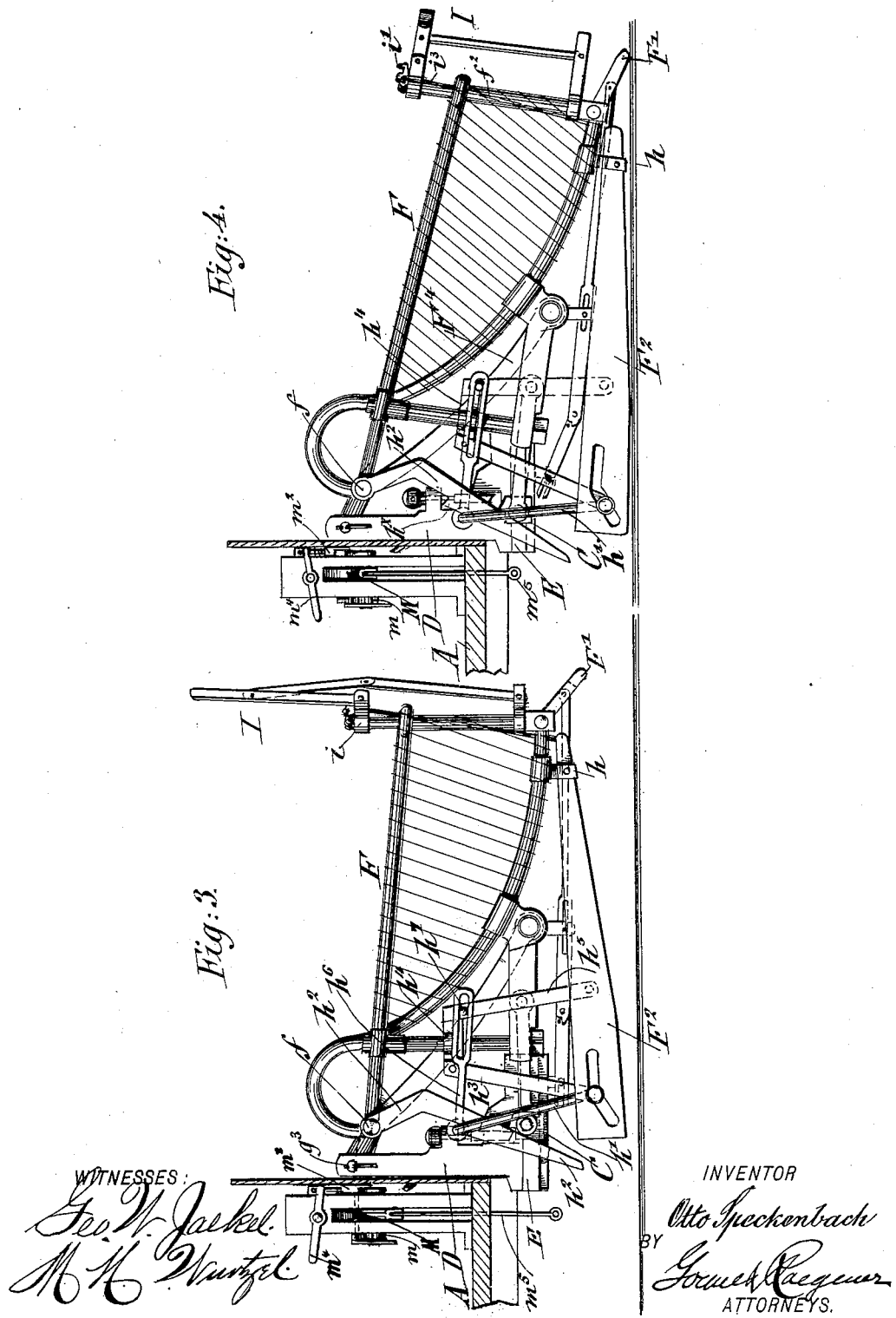
WITNESSES
Geo. W. Jaekel
M. H. Wurtzel
INVENTOR
Otto Speckenbach
BY
Gormer & Raegener
ATTORNEYS.

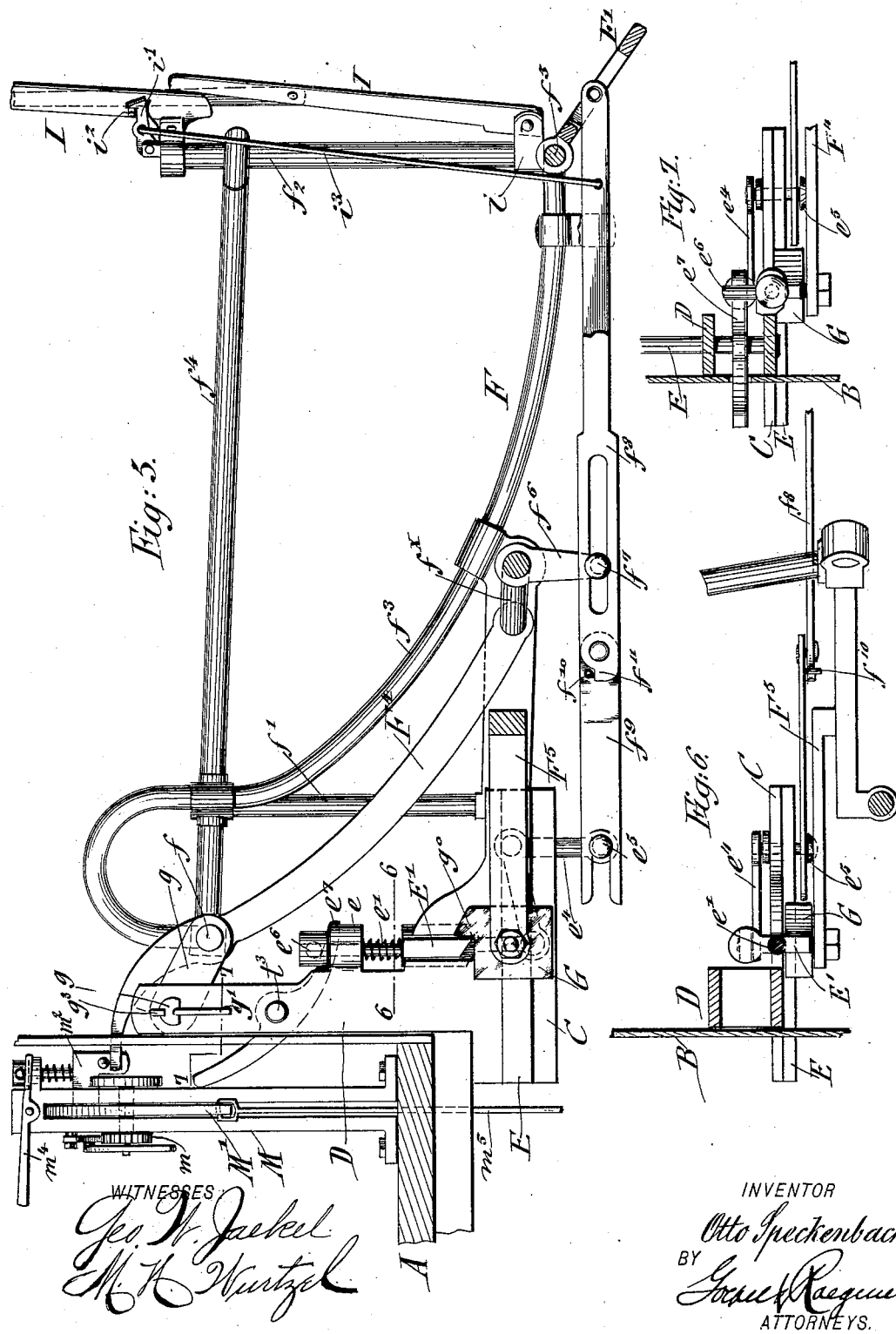

(No Model.)  4 Sheets—Sheet 4.
O. SPECKENBACH.
FENDER FOR TROLLEY CARS.
No. 599,920. Patented Mar. 1, 1898.
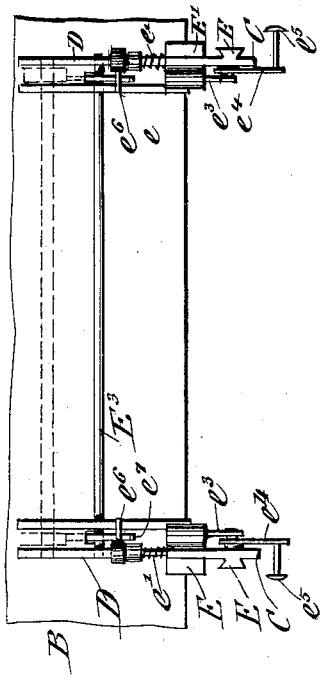
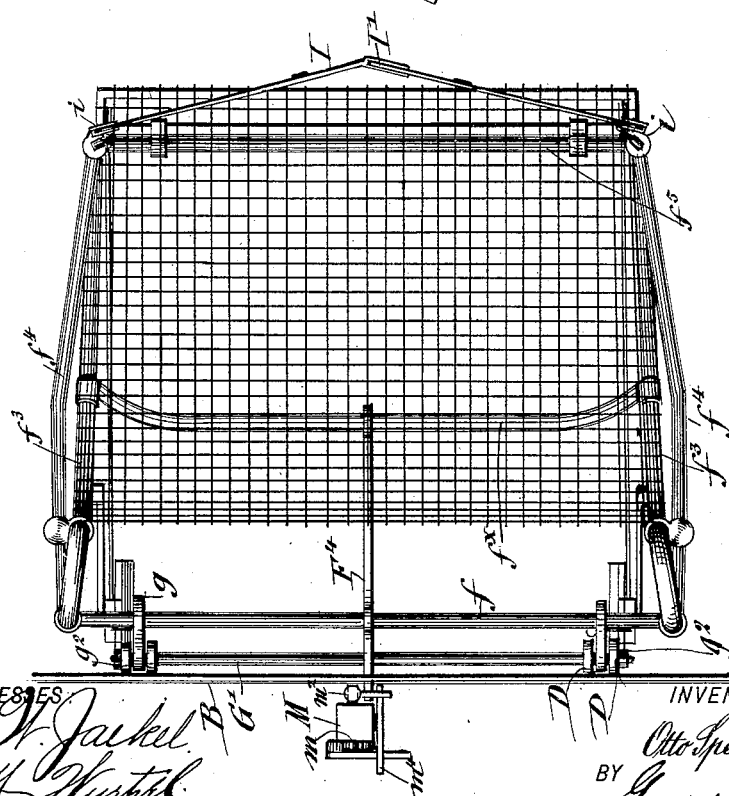
WITNESSES
Geo. W. Jackel
M. H. Wurtzel
INVENTOR
Otto Speckenbach
BY
Toeuer & Raegener
ATTORNEYS.
THE NORRIS PETERS CO., PHOTO-LITHO., WASHINGTON, D. C.

UNITED STATES PATENT OFFICE.

OTTO SPECKENBACH, OF NEW YORK, N. Y., ASSIGNOR OF ONE-HALF TO AUGUST TRIEB, OF SAME PLACE.

FENDER FOR TROLLEY-CARS.

SPECIFICATION forming part of Letters Patent No. 599,920, dated March 1, 1898.

Application filed October 11, 1897. Serial No. 654,829. (No model.)

*To all whom it may concern:*

Be it known that I, OTTO SPECKENBACH, a citizen of the Empire of Germany, residing at the city of New York, in the county and State of New York, have invented certain new and useful Improvements in Fenders for Trolley-Cars, of which the following is a specification.

This invention relates to certain improvements in fenders for trolley, cable, and other cars in which an auxiliary fender is employed for lowering the main fender and the guard-plates at both sides of the fender, so as to prevent a body from passing below the wheels of the car, whereby a person is protected from injury by the automatic lowering of the fender and guard-plates; and the invention consists of a main fender pivoted to the dashboard of the car, an auxiliary fender hinged to the front end of the main fender, a mechanism between the auxiliary fender and the main fender, whereby the latter is dropped from its raised position when the auxiliary fender is oscillated, so as to be lowered close to the track in line with the auxiliary fender.

The invention consists, further, in the arrangement of the guard-plates at both sides of the main fender and the mechanism for lowering or raising the same by the lowering or raising of the main fender.

The invention consists, further, of the connection of the main fender, by a lever mechanism, with the brakes of the car, so that the latter are automatically applied whenever the main fender is lowered and thereby the car brought to a quick stop.

The invention consists, further, of a certain mechanism by which the fender can be lowered by the motorman; and the invention consists, further, of folding gates applied to the front of the main fender and operated by the action of the auxiliary fender, so as to be dropped when the main fender is lowered.

The invention consists, lastly, of certain details of construction and combinations of parts, which will be fully described hereinafter and finally pointed out in the claims.

In the accompanying drawings, Figures 1 and 2 represent vertical longitudinal sections of a car-body, showing the connection of my improved fender with the brake mechanism of the car, the fender being respectively in normal or raised position, and in lowered position when in use and with the brakes applied. Figs. 3 and 4 are side elevations of my improved fender, showing the same respectively in normal raised and in lowered position ready for action; Fig. 5, an enlarged side elevation of the fender, parts being in section. Fig. 6 is a detail section, parts being broken away, on line 6 6, Fig. 5; and Fig. 7 is a similar section on line 7 7, same figure. Fig. 8 is a plan view of the fender. Fig. 9 is a front elevation of the parts attached to the dashboard of the car, the fender being removed. Figs. 10 and 11 are detail views of the releasing mechanism back of the dashboard by which the brakes are automatically applied as soon as the fender is lowered.

Similar letters of reference indicate corresponding parts.

Referring to the drawings, A represents the bottom frame of a trolley, cable, or other car; B, the dashboard of the same. To the front of the dashboard are attached L-shaped brackets having upright portions D and horizontal portions C, said upright portions D being adapted to receive the pivot connection of the main fender, while the lower portions are so arranged that they support the mechanism for locking the main fender in raised position. The L-shaped brackets or angular supports C D are made of sufficient strength to support the entire weight of the fender and its accessories and are arranged at each end of the car, so that the fender can be readily detached from one end and applied to the opposite end of the car when the same arrives at the end of the line and commences its trip in the opposite direction. On each of the lower horizontal bracket portions C is arranged a dovetailed guide-piece E. Above the horizontal dovetailed guide-piece E is arranged a sleeve-shaped keeper $e$, in which is guided the shank $e'$ of a spring-actuated latch $E'$, that locks normally into a recess in the upper part of the horizontal bracket portion C. The latch $E'$ is connected by a downwardly-extending arm $e^3$ with the upper shorter arm of a bell-crank lever $e^4$, that is fulcrumed to the inner side of the horizontal part C, the lower end of said bell-crank lever being provided with a laterally-extending pin $e^5$, for the purpose to be described. The upper end of the latch is provided with a laterally-extending pin $e^6$, which is engaged by an arm $e^7$, that is attached to a transverse pivot-shaft $E^3$, which turns in bearings of the vertical bracket portions D, one of the arms being extended through a slot in the dashboard B to the inside of the same, so as to form either a lever-handle or a treadle, as the case may be, for permitting the motorman to act with his hand or foot on the same and thereby raise at will the locking-latches $E'$.

The fender attachment consists of three main parts—a main fender F, an auxiliary fender $F'$, which is hinged to the lower front part of the main fender, and oscillating guard-plates $F^2$, which are arranged at both sides of the main fender. The main fender is composed of a transverse main rod $f$, rear and front upright stays $f'$ $f^2$, respectively, curved side rods $f^3$, that extend from the ends of the main rod $f$ alongside of the upright rear stays $f^2$ to the lower ends of the upright front stays $f^2$, and horizontal side rods $f^4$, that connect the ends of the upper main rod $f$ with the upright rear and front stays $f'$ $f^2$. The curved side rods $f^3$ and the lower front rod $f^5$ are connected by wire or other suitable netting, and also the curved side rods, straight side rods $f^4$, and front stays $f^2$, so that a scoop-shaped fender is obtained that is equal in width to the car and is constructed of sufficient strength to take up the body of any person that may get into the path of the car. To the upper main rod $f$ are keyed arms $g$, by which the hinge connection of the main fender F with the upright bracket portions D is made. For this purpose the stationary arms $g$ are inserted between the upright bracket portions D and connected by a shaft $G'$, which is inserted through the eyes of the same, said shaft being provided with an eccentric flange $g^2$, that enters in a keeper $g^3$ on one of the upright bracket portions D, said shaft being provided with a handle $g'$, so as to permit the ready insertion of the shaft into the hinge-eyes of the portions D and the rotation of said shaft, so that the eccentric flange is engaged by the keeper $g^3$. When the fender is to be removed from one end of the car to the other, the handle is turned upwardly, so that the shaft is given a part rotation and the eccentric flange $g^2$ is disengaged from the keeper $g^3$. When in this position, the shaft can be readily withdrawn by taking hold of the handle and the fender detached, moved to the other end of the car, and connected thereto in the same manner by reinserting the shaft. To the inwardly-projecting arm $F^5$, supported by the curved side rods $f^3$ of the main fender, is pivoted a locking-block G, provided with a dovetailed recess, so that the block can be guided on the stationary guide-piece E. The upper part of the guide-block is formed with a tooth $g^0$, against which abuts the locking-latch $E'$. When the fender is placed in position on the car, the locking-blocks G are slid on the dovetail guide-pieces before the hinged connection with the arms $g$ and the shaft G is made.

The curved side rods of the main fender are connected about midway by a cranked transverse rod $f^\times$, which is connected at its center by a lever $F^4$ with the transverse main rod $f$, said lever being extended in upward direction and through a slot in the dashboard, so as to engage an automatic releasing mechanism which is arranged at the inside of the platform of the car and which will be described hereinafter. At both ends of the transverse rod $f^5$ are arranged downwardly-extending arms $f^6$, that carry headed guide-pins $f^7$. On these guide-pins are guided the slotted ends of pusher-rods $f^8$, the front ends of which are pivoted to the auxiliary fender $F'$, which is hinged to the lower front rod of the main fender, and which is in the shape of an oblong frame that is covered by suitable wire-netting. To the slotted ends of the pusher-rods $f^8$ are pivoted forked extensions $f^9$, which rest by side pins $f^{10}$ on shoulders $f^{11}$ of the pusher-rods $f^8$, and which extensions are adapted to engage lateral pins $e^5$ on the lower ends of the bell-crank levers $e^4$, which are fulcrumed to the brackets C D, before described. When the fender is placed in position on the car, care has to be taken that the forked extensions $f^9$ pass over the laterally-extending pins $e^5$ of the elbow-levers. The pusher-rods, as well as their extensions, serve, in connection with the auxiliary fender $F'$, when the latter is lowered, by striking an obstruction on the track, for pushing the elbow-levers backward and raising thereby the latches $E'$ against the tension of their spring a certain height, so as to release the locking-blocks G and permit the backward motion of the same on the guide-pieces E, whereby the main fender is released into its lower position by swinging on the shaft $G'$ and the pivot connection with the locking-blocks. This position of the main and auxiliary fenders is shown in Figs. 2 and 3 and shows that the auxiliary fender forms a continuation of the inclined main fender, so that any person that may happen to be on the track is readily scooped up over the auxiliary fender onto the main fender.

The guard-plates $F^2$, which are arranged at each side of the main fender, are pivoted at their front ends to clips $h$, attached to the side rods of the main fender, and are connected at their slotted rear ends to links $h'$, which are each guided by an antifriction-roller at its upper ends over a stationary locking-arm $h^2$, that is provided with a latch or hook $h^\times$, into which the antifriction-roller passes when the guard-plates are in raised position. A strap $h^3$ passes from the pivot $p$ of the link $h'$ in upward direction and is pivoted to a sleeve $h^4$, which is guided on the rear stay $f'$, said sleeve being connected by a pivoted strap $h^5$ with guard-plate $F^2$, as shown in Figs. 3 and 4. The upper end of the link $h'$ is connected by a horizontal strap $h^6$, having a slotted front end with a headed guide-pin $h^7$ on the strap $h^5$, so that by the coöperation of the link and straps the fender is placed in raised position and locked to the stationary arms $h^2$, applied to the ends of the main rods $f$ of the main fender F. The lowering of the main fender F produces also the lowering of the side guard-plates, so as to be in closed position, as shown in Fig. 4. As the side guard-plates are preferably slightly curved in outward direction from the narrow front end of the main fender to the wider rear end of the same and extend somewhat over the track, they serve to push anybody falling sidewise over the main fender away from the track, so as to prevent it from getting below the wheels of the car. The raising and lowering motion of the side guard-plates automatically follows the raising and lowering of the main fender.

In locking position of the parts the upper end of the link $h'$ is in engagement with the hook $h^\times$. When the fender is suddenly lowered, the shock causes link $h'$ of the guard-plate $F^2$ to be jerked out of connection with the hook and the parts will assume the position shown in Fig. 4, the strap $h^7$ acting to prevent the link from falling away from the arm $h^2$ and to hold the antifriction-roller against the latter, so that the same can be properly returned into engagement with the hook. The function of the strap $h^5$, sleeve $h^4$, and strap $h^3$ is to push the link $h'$ up, so that its upper end will be engaged with hook $h^\times$ when the guard-plate is raised.

For the purpose of simplifying the construction of the fender adjustable side guard-plates may be dispensed with, they being connected rigidly to the frame of the fender, and I am desirous of protecting both constructions—namely, movable side guard-plates that act independently of the fender in raised or lowered position or guard-plates that are connected permanently to the fender and do not act independently of but with the same.

At the front corners of the main fender and hinged to the upright front posts of the same are arranged folding drop-gates I, which are pivoted to lugs $i$ on said posts and retained in folded upright position alongside of the posts by means of spring-hooks $i'$, pivoted to the upper ends of the posts, so as to engage studs $i^2$ on the uppermost bars of the drop-gates I. The spring-hooks are connected by connecting-rods $i^3$ with the push-bars $f^8$ back of the hinged auxiliary fender F', said rods being pivoted to the push-bars, so that as soon as the auxiliary fender is pressed in backward downward direction a pull is exerted through the medium of the lowering forward ends of said push-bars by the rods $i^3$ on the spring-hooks $i'$, so that they are disengaged from the studs $i^2$ on the upper gate-bars, which thereby permits both gates to drop by gravity, the gates, by reason of the fact that the lugs $i$ on which they are pivoted slant inwardly toward the longitudinal center of the fender, meeting in a projecting angle and being locked together by the forked end I' of one gate-bar engaging the end of the upper gate-bar of the other gate, as shown in Fig. 8. The drop-gates are for the purpose of preventing anybody that has been scooped up by the main fender from rolling off the latter. As the individual parts of the folding gates are made of thin steel bars, their weight in dropping is not sufficient to injure any person or body that is scooped up by the fenders. After an accident has happened and the fender been lowered, together with the gates, the gates are returned by the motorman into their upright and locked position, and likewise the main and auxiliary fenders, which latter is accomplished by lifting the fenders until the locking-blocks G are reëngaged by the latches E'. Simultaneously with the return of the fenders into raised position the movable guard-plates are restored to their normal position, as shown clearly in Fig. 3.

The transverse brace-rod of the main fender F is, as before described, connected by a stationary center arm $F^4$ with the transverse upper rod of the fender, the center arm being loosely applied thereto by an eye and extending back of said rod through a slot in the dashboard of the car, so as to form connection with the brake-releasing mechanism. This mechanism consists of upright standards M, that carry a fulcrumed and weighted lever M', on the fulcrum of which is arranged a pawl-and-ratchet mechanism $m$, by which the weighted lever is retained in a raised position. A locking-cam $m'$ is also arranged on said fulcrum, which locking-cam is engaged by a spring-actuated latch $m^2$, so that the weighted lever is held in raised position until engaged by the upper end of the center arm. As soon as the fender is dropped into its lower position, either by the action of an obstruction on the track or the auxiliary fender or by the direct action of the motorman on the releasing-lever, the center arm is raised, whereby the latch $m^2$ of the releasing mechanism is raised, so that the locking-cam is released and the weighted lever dropped. The releasing mechanism can also be operated by a fulcrumed hand-lever $m^4$, which is arranged alongside of the standard M, on which the described parts of the releasing mechanism are arranged, said hand-lever engaging a pin at the upper end of the latch, so as to raise it and produce thereby the release of the weighted lever and the application of the brakes. The pawl of the pawl-and-ratchet mechanism can likewise be actuated by a hand-lever, so as to permit the release of the ratchet-wheel and the return of the weighted lever into its normal raised position. The end of the weighted lever is connected by a pivot-rod $m^5$ with an intermediate lever $m^6$, which engages by a pin-and-slot connection the end of a beam M', pivoted to a hanger $M^0$ on the car-floor, and its pivot being provided with a crank-arm $M^2$, which carries a pinion $m^7$, that engages gear-wheel $m^8$, keyed fast to the rear axle of the truck, said gear-wheel actuating the pinion as soon as the beam $M'$ is lowered by the releasing mechanism. By the rotating of the pinions the brake-chain $m^9$ is wound up on the pinion-shaft, said chain passing over guide-pulleys $m^{10}$ and being connected to the end of a fulcrumed brake-actuating lever $M^4$, which is connected by arms with the pivot-links that carry the brake-shoes. As soon as the releasing mechanism is actuated and the weighted lever dropped by the intermediate brake-actuating mechanism described the brake-shoes are applied to the wheels of the car and thereby the car stopped either by the action of the fender in case of an accident or by the direct action of the motorman releasing the mechanism, as the case may be. As soon as the weighted lever is returned into its normally-raised position the beam $M'$ is likewise lifted again by the intermediate lever, the gear-wheel $m^8$ and pinion $m^7$ being placed out of mesh, so that the brake-shoes are dropped away from the wheels and into their normal position, the operating-chain following the weight of the brake-shoes and returning again into the position which it had before the brake-shoes were applied.

In addition to the mechanism for actuating the brakes from the fender in connection with the fenders there may be arranged in the case of trolley-cars a mechanism for cutting out the current to the electric motor, so that the car is thereby brought quickly and effectively to a stop. This mechanism is not shown in the drawings, and the same forms no part of this invention, as any suitable mechanism for this purpose may be devised; neither do I claim the special construction of the brake, as any approved brake construction may be used.

The operation of my improved fender attachment is readily perceivable from the foregoing description, the essential features consisting in the action of the hinged auxiliary fender arranged at the front of the main fender and the releasing mechanism, by which the main fender is unlocked and dropped, so that the auxiliary fender is placed close to the rails and both fenders thereby placed in position for scooping up anybody without injury who may be in danger of being crushed under the wheels of the car. In addition to the dropping motion of the fenders, by which the body or other obstruction can be scooped up, the side guard-plates, which are lowered by the fenders, push the body sidewise off the track and out of the way of the wheels, so that the body cannot get under the wheels and be crushed thereby. In case the motorman sees the obstruction before striking the same he can lower the fenders by direct treadle action, so as to scoop up the obstruction and apply the brakes. In case, however, the body gets on the track before the motorman's attention is drawn to it, the unlocking of the mechanism will cause the dropping of the main fender and the applying of the brakes, so that the obstruction can be scooped up or moved sidewise of the track by automatic action without the direct intercession of the motorman. After the car has been stopped the body is removed from the fender and the latter, together with the auxiliary fender, returned into raised position and relocked therein. The gates are also returned in raised position, and the car is then ready to proceed on its course, the fender then being ready for the next obstacle or person.

Having thus described my invention, I claim as new and desire to secure by Letters Patent—

1. The combination of a main fender, a link to which the same is hinged and which is itself hinged to the dashboard of a car, an auxiliary fender hinged to the front end of the main fender, a locking mechanism for holding the main and auxiliary fenders in raised position, and means interposed between the auxiliary fender and the locking mechanism for producing the release of the locking mechanism and the dropping of the main and auxiliary fenders, substantially as set forth.

2. The combination of a main fender, a link to which the same is hinged and which is itself hinged to the dashboard of a car, an auxiliary fender hinged in front of the main fender, pusher-rods pivoted to the auxiliary fender and actuated by the same, and a locking mechanism comprising sliding guide-blocks to which the fender is pivoted, said locking mechanism being adapted to be unlocked by said pusher-rods so that the main and the auxiliary fenders are dropped and the guide-blocks pushed back, substantially as set forth.

3. The combination of a main fender hinged to the dashboard of a car, an auxiliary fender hinged to the front end of the main fender, sliding guide-blocks connected with the fender, spring-actuated latches for locking said guide-blocks, pusher-rods pivoted to the auxiliary fender, and intermediate elbow-levers connecting said pusher-rods with the latches so as to release the same and produce the dropping of the fenders, substantially as set forth.

4. The combination of the main fender hinged to the dashboard of a car, an auxiliary fender hinged to the front end of the main fender, means for locking the fenders in raised position, means for releasing the fenders so as to permit their dropping into lower position, and guard-plates arranged along the sides of the main fender, substantially as set forth.

5. The combination of the main fender hinged to the dashboard of a car, an auxiliary fender hinged to the front end of the main fender, means for locking the fenders in raised position, means for releasing the fenders so as to permit their dropping into lower position, guard-plates arranged along the sides of the main fender, and a mechanism arranged between the main fender and the rear ends of said guard-plates and adapted to raise or lower said guard-plates simultaneously with the lowering and raising of the fenders, substantially as set forth.

6. The combination of the main fender hinged to the dashboard of a car, an auxiliary fender hinged to the front end of the main fender, means for locking the fenders in raised position, means for releasing the fenders, so as to permit their dropping into lower position, guard-plates pivoted at their front ends to the sides of the main fender, angle-levers applied to the upper main rod of the main fender, and a lever mechanism interposed between the said angle-levers and the rear of the guard-plates so as to produce the lowering or raising of said guard-plates simultaneously with the raising or lowering of the fenders, substantially as set forth.

7. The combination with the main fender hinged to the dashboard of a car, an auxiliary fender hinged to the front end of the main fender, folding gates hinged to the front posts of the main fender, means for locking said folding gates into upright position, and a lever mechanism actuated by the auxiliary fender so as to unlock the gates and permit the dropping and closing of the gates by their own weight, substantially as set forth.

8. The combination, with the brake-shoes acting on the wheels of the car, mechanism carrying said shoes, a brake-actuating beam, and means interposed between the latter and the shoe-carrying mechanism and adapted to cause the shoes to be applied by the rotation of the wheels, of a movable fender and mechanism actuated by said fender and connected with the said beam for automatically lowering the same and applying the brake-shoes to the wheels, substantially as set forth.

In testimony that I claim the foregoing as my invention I have signed my name in presence of two subscribing witnesses.

OTTO SPECKENBACH.

Witnesses:
PAUL GOEPEL,
GEO. S. WHEELOCK.